United States Patent
Brambilla

[11] Patent Number: 5,916,692
[45] Date of Patent: *Jun. 29, 1999

[54] MULTILAYER POLYETHYLENE FILM

[75] Inventor: Giuseppe Brambilla, Novara, Italy

[73] Assignee: Manuli Stretch S.p.A., Latina, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/639,034

[22] Filed: Apr. 16, 1996

[30] Foreign Application Priority Data

Sep. 1, 1995 [IT] Italy ............................. MI95A1850 U

[51] Int. Cl.$^6$ ..................................... B32B 27/32
[52] U.S. Cl. .................. 428/516; 428/515; 428/500; 428/523
[58] Field of Search ..................... 428/213, 500, 428/515, 516, 523, 218; 525/240

[56] References Cited

U.S. PATENT DOCUMENTS

| | | | |
|---|---|---|---|
| 4,379,197 | 4/1983 | Cipriani et al. | 428/220 |
| 4,399,180 | 8/1983 | Briggs et al. | 428/212 |
| 4,923,750 | 5/1990 | Jones | 428/349 |
| 5,019,315 | 5/1991 | Wilson | 264/171 |
| 5,085,927 | 2/1992 | Dohrer | 428/220 |
| 5,093,188 | 3/1992 | Dohrer | 428/215 |
| 5,147,709 | 9/1992 | Dohrer | 428/213 |
| 5,407,732 | 4/1995 | Dokurno | 428/213 |

FOREIGN PATENT DOCUMENTS

| | | |
|---|---|---|
| 0009376 | 4/1980 | European Pat. Off. . |
| 0287272 | 10/1988 | European Pat. Off. . |
| 0298700 | 1/1989 | European Pat. Off. . |
| 0317166 | 5/1989 | European Pat. Off. . |
| WO 92 12010 | 7/1992 | WIPO . |
| WO 94 15787 | 7/1994 | WIPO . |
| WO 95 21743 | 2/1995 | WIPO . |

*Primary Examiner*—Mark L. Warzel
*Attorney, Agent, or Firm*—Sughrue, Mion, Zinn, Macpeak & Seas, PLLC

[57] ABSTRACT

Multilayer film wherein the main layer comprises as essential components linear low density polyethylene LLDPE with density values comprised between 0.915 and 0.935 g/cm$^3$ in mixture with minor proportion of low density polyethylene LDPE or wherein the LDPE forms an adjacent layer coextruded with the layer of LLDPE.

The film is prepared by cast extrusion using particular conditions of quenching and stretching.

8 Claims, 1 Drawing Sheet

MULTILAYER POLYETHYLENE FILM

BACKGROUND OF THE INVENTION

The present invention relates to stretchable rigid films endowed of valuable mechanical properties which render the same particularly suitable for applications in the field of pallets packaging and the method of preparation thereof.

The packaging of pallet units is normally made using stretchable films or thermoshrinkable films.

The stretchable film is a multilayer film based on polyolefin resins using the cast or buble technology and can be diversified in the production stage in standard film or in prestretchable film.

The standard film is normally used for carrying out manual packaging or on semi-automatic machines subjected to light loading work.

The prestretchable film, on the contrary, is utilized for big packaging lines operating at very high production output. Actually, the user of the film applies to the platform of the pallet a film of given thickness which is suitably reduced by a particular wrapping system and film application, which stretches the same to the desired percentage (generally 100–200%) by means of two cylinders having different velocities.

It is possible in this way to limit the amount of film used assuring in the meantime an adequate mechanical holding of the load to the pallet platform.

The thermoshrinkable film can be subdivided into films with monoaxial shrinkage and films with biaxial shrinkage.

This latter one is normally used in the pallet packaging. Differently from the stretchable film, the thermoshrinkable one is applied with a more complex technique. The pallet unit is at first "hooded" with the film and then subjected to a heating process in oven at temperature higher than 100° C. Thanks to that, the "hood" made with the film shrinks fixing the load to the pallet platform with a reasonable but not excessive compression stress.

The stretchable film comprises a layer of adhesive material which assures auto-adhesivity of the film during the packaging step. The films can have also sliding characteristics to avoid the sticking of the platforms when in contact.

Both films present natural limits of application.

The use of the prestretchable films is justified only in presence of automated machines with a high output: only in this case infact the cost increase and the greater complexity of the production line dictated by the presence of a suitable unit for the prestretching of the material, become acceptable.

Another inconvenience of the prestretchable film is represented in some applications by an insufficient holding force on the loads when piled in many rows, such as are realized in the industry of mineral water, paper and similar products.

For these special applications, its use is inadequate because a package is obtained lacking the mechanical resistance necessary to avoid the shifting of the load when the platform is moved.

Also the use of the thermoshrinkable film implies evident inconveniences; the running costs of the packaging process are high and in any case superior to those of the stretchable film. Furthermore it is impossible to use this product for some types of loads in view of the high temperature to which the palletized unit is subjected before wrapping.

The heating step, due to the high temperature reached, may irreversibly impair the load.

DETAILED DESCRIPTION OF THE INVENTION

Figure 1:
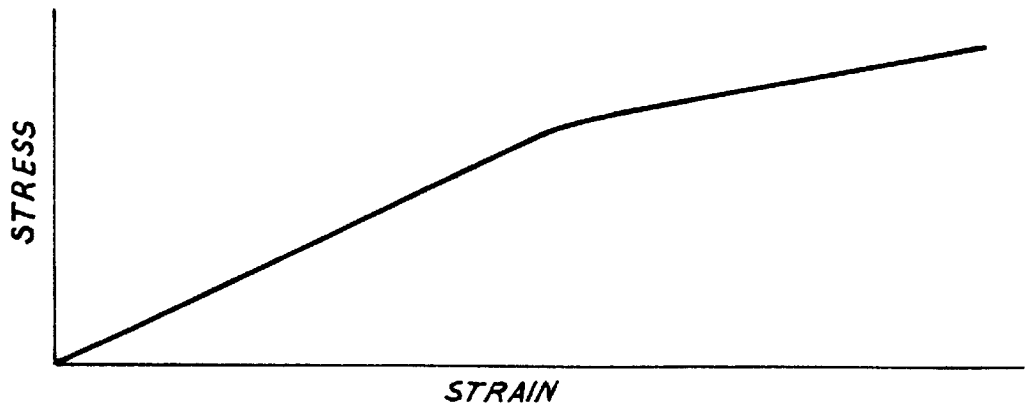
FIG. 1 shows the stress/strain curve of a film of the present invention.

It has now unexpectedly been found that it is possible to obtain a multilayer polyethylene film sufficiently rigid and contemporaneously having good stretchability, which allow to overcome the drawbacks presented by the conventional films and which is usable for any type of load on the pallet units using decreased quantity of material.

Furthermore the running cost savings with respect to the thermostretchable film are superior since the procedures of the thermal treatment are completely eliminated and the weight of polymer used for the film is reduced with consequent reduction of the cost of packaging.

The multilayer film of the invention comprises a main layer (generally formmg the central layer) comprising as essential components linear low density polyethylene (LLDPE) with density values comprised from 0.915 to 0.935 $g/cm^3$, and low density polyethylene (LDPE) used in blend with LLDPE or present as an adjacent layer co-extruded with the LLDPE layer.

The LDPE polyethylene is present in quantity from 8 to 40%, preferably from 15 to 25% by weight with respect to LLDPE.

Preferably, LDPE is mixed with LLDPE in the extruder which feeds the LLDPE layer. It is also possible to co-extrude LDPE with LLDPE to form adjacent layers. Other polymers compatible with LLDPE as for example LLDPE with density slightly superior to that of the polymer of the main layer and which can arrive to about 0.940 $g/cm^3$ can be used in mixture with LLDPE or to be co-extruded to form one of the layers of the multilayer film.

The amount used is comprised between about 5 and 40% by weight on the sum of LLDPE and LDPE.

To the purpose of rendering the film adhesive, a layer of polymeric adhesive material is co-extruded, capable of confering the film adhesive properties allowing the adhesion of the film once the packaging is completed.

The polymer used for the adhesive layer generally is LLDPE with density comprised from 0.895 to 0.910 $g/cm^3$.

In some applications, the film requires sliding properties such as to avoid the sticking of the packaged platforms when the same are brought into contact.

The sliding properties which can be conferred to the inside or outer side of the film are obtained using LLDPE with density of about 0.930 $g/cm^3$.

The film of the invention comprises a main layer, generally a central layer, a layer of adhesive material and, in one of the prefered embodiment, a layer of LLDPE with density slightly superior to that of LLDPE of the main layer.

The main layer can be added with additives normally used in the polymer field, such as dyes, pigments, antioxidants, flame retarders, nucleating agents.

As already indicated, the film of the invention is characterized by high rigidity and contemporaneously by sufficient stretchability: the film is rigid but stretchable.

The yield tensile stress is remarkably higher than the one of the stretchable conventional film and can reach values up to 6 or more times higher.

The Young's modulus is also higher (of about 20–30%).

The values of the yield tensile stress are comprised between about 15 and 70 N/mm² and the Young's modulus ranges from 70 to 160 N/mm² and the elongation at break is comprised between 60 and 500%.

The values are refered to the machine direction.

There are not known in literature multilayer or monolayer polyethylene films having values of the Young's modulus superior to 120–130 N/mm², wherein the ratio between the elongation at break and the yield tensile stress is lower than 40–50, and in particular comprised between 2 and 15 as in the case of the invention film.

Figure 2:
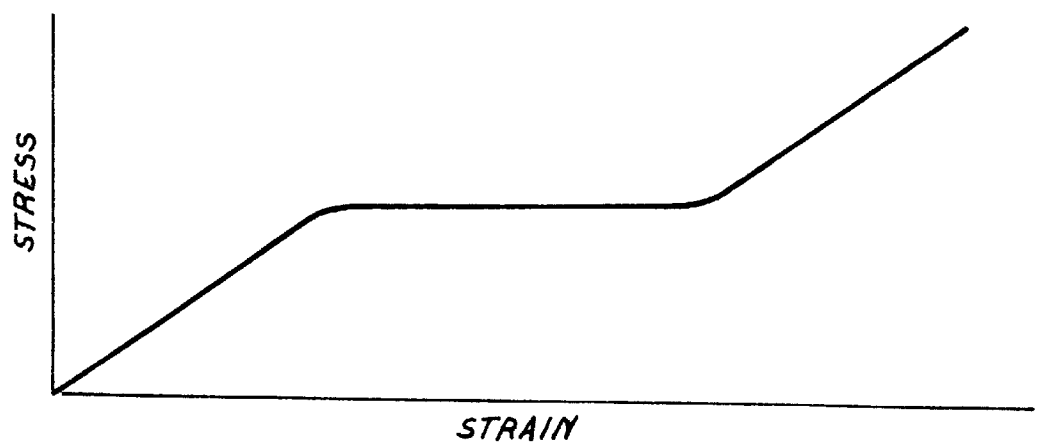
FIG. 2 shows the stress/strain curve of a conventional film.

The difference between the film of the invention and the stretchable conventional one is shown by the stress/strain curve reported in FIGS. 1 and 2. In the case of the invention film (FIG. 1) the curve shows a very high slope in the elastic part and a very narrow yield plateau: this assures a rigid behavior of the film with limited deformations even for significant loads having vertical development.

In the case of the conventional film (FIG. 2), the curve shows, already at relatively low deformation values, a very broad yield plateau.

This behavior renders the film unsuitable for many applications in the packaging of palletized units. The high stiffness properties of the film of the invention render the same paritcularly suitable for the packaging either of light loads (mineral water, food and pharmaceutical products and the like) or medium-heavy heavy loads (bricks and tiles, ceramic products, cement, paper, mechanical parts, etc.).

The films are moreover used for packaging of big dimension bobbins, bale wrapping, and for the wrapping of structural parts and laminates.

The prestretch applicable during the packaging steps is comprise between 20 and 50%.

The film can be produced with thickness from 10 to 100 micron and stripe from 250 to 2000 mm.

The LLDPE and LDPE useable in the preparation of the films of the invention are well known polymers and the preparation methods thereof are extensively described in literature.

The LLDPE polyethylene is prepared by polymerization of ethylene in mixture with α olefins $CH_2=CHR$ wherein R in general is an alkyl radical with 1–12 carbon atoms, preferably butene-1, hexene-1, octene-1, using Ziegler-Natta coordination catalysts obtained by reaction of transition methal compounds, preferably Ti and V compounds and from alumino-alkil compounds. It is also possible to use catalysts obtained from metallocene compounds and alumoxane compounds.

The metallocene compounds have in general formula $Cp_2MX_2$, wherein Cp is a cyclopentadienyl ring and one of the two rings is alkyl substituted or the two rings are bridged; M is Zr, Ti, Hf or V; X is halogen or an alkyl radical.

Metallocene compounds with constrained geometry are used for the preparation of LLDPE endowed of particular properties.

The polymerization of ethylene in mixture with the α olefins is in general carried out in gas phase or in solution.

The LLDPE has in general density comprised between 0.890 and 0.935 g/cm³.

The copolymerized α olefins are inserted in the chain in quantity from 0.5 to 20% by mols.

The LLDPE finds application particularly in the preparation of films. Its processability however is not too big and it has been tried to improve the same by various ways.

One of these ways consists in adding the polymer with a copolymer of propylene with minor proportion of a higher α olefins, particularly butene (from 5 to 15% by weight of α olefins) optionally in mixture with ethylene (up to 10% by weight on the copolymer).

Modified LLDPE of this type is described in literature.

Any LLDPE, modified or not, having density values comprised between 0.915 and 0.930 g/cm³ are suitable for the preparation of the film of the invention.

The polymer density is measured according to ASTM 1D 1505.

Prefered are polyethylenes with density comprised between 0.915 and 0.920 g/cm³. The melt index preferably is 2–3 g/10' (ASTM D 1238-65T, E condition).

The LDPE is prepared by radical polymerization of ethylene using high pressure processes.

The polymer is caracterized by the presence in the chain of long branches which render the polymer suitable for the preparation of films endowed of valuable properties.

LDPE is also used in mixture with LLDPE to improve the transparency properties of the film. It is surprising and completely unexpected that from blends of LLDPE and LDPE it is possible to obtain, by properly selecting the filming condictions, films endowed of high rigidity and contemporaneously stretchable.

Operating under the normal filming conditions, blends of LLDPE and LDPE give films which are strechtable but not rigid.

The preparation of the films of the invention is carried out by cast-extrusion technology comprising a battery of extruders (two or more extruders, generally monoscrew extruders with variable span of the screw, to obtain a good material homogenization) that feeds a feed-block device which, by means a suitable mechanical action, stratifies the material leaving the extruders as a function of the extruder it comes from.

The bar leaving the feed block device is formed of several layers of which the central one comes from the extruder of the greater diameter and the side ones from the remaining extruders.

The bar is then sent to a spreading head wherefrom, by effect of mechanical action it is forced to come out in atmosphere through a small thickness slit, forming a plastic sheet wherein the main dimension is the breadth with respect to the thickness.

The material leaving the spreading head is deposited on a first chill roll, rotating at high speed, wherein the material is stretched and contemporaneously cooled.

For the same extruder through put and other conditions, the thickness of the material is a function of the speed of the first roll.

Actually, higher is the speed of this roll, lower is the thickness of the collected film.

The material leaving the first roll feeds a second cooled roll endowed of rotation speed higher than that of the first roll.

The parameters which characterize the invention process are the temperature of the cooling water of the first and second roll and their difference; the relative velocity of the two rolls; the distance between the spreading head and the contact point of the film on the chill roll.

The temperature of the cooling water of the first roll is mantained between 10° and 25° C., preferably between 15° and 18° C.; that of the second roll is equal or lower than that of the first roll and mantained between 10° and 20° C., preferably 12° and 15° C.

The relative flow between the first and the second roll is set in such a way that the velocity of the second roll is from 10 to 40% higher than that of the first roll, preferably 20–30% greater.

The rolls speed generally is comprised between 300 and 450 m/min.

The temperature of the cooling water and the difference in temperature between the first and second roll implies a difference of the cooling speed of the material and consequently a change of the spherulitic morphology of the polyethylene matrix.

All that influences the film mechanical properties.

The temperature regulation combined with the relative flow of the material between the rolls has the effect of producing in extreme cases very different materials.

Under the same condition, to obtain very elastic films it is necessary to reduce a minimum the temperature difference between the two rolls and at the same time the speed difference between the rolls.

In the opposite manner, to obtained very rigid films, it is necessary to maximize both the temperature difference between the two rolls (to accelerate the quenching of the material) and the speed difference.

Between the two extreme situations there is a range of regulation possibilities which can be utilized as a function of the characteristics of the material to be produced.

Another important parameter is the distance between the spreading head and the contact point on the first roll.

For instance, to obtain a multilayer film having a yield tensile stress comprised between 40 and 70 N/mm$^2$ and an elongation at break from 60 and 200%, the cooling water of the first chill roll is maintained between 15° and 20° C. and that of the second roll between 10° and 15° C. and the difference of velocity between the rolls is 25–35% higher for the second roll.

Generally, the slit through which the material is forced to come out from the spreading head, is of 0.3–0.5 mm and is a function of the final thickness of the film and of the stretch to which the film is subjected. Preferably the thickness is from 8 to 20 micron.

The temperature of the material coming out from the spreading head is in general comprised between 230° and 260° C. The distance between the head and the contact point of the material is regulated by means of two distinct actions: the first one merely geometric consists in the approaching (distancing) the rolls to the lip, at the head exit; the second one which influences the profile of the material fall is performed by the adequate regulation of a system of air aspiration placed on the lower part of the spreading head to the aim of realizing a depression near to the point of contact of the film on the roll, which allows an effective adhesion of the film.

Changing the aspiration, the profile with which the material runs the distance from the lip of the head to the chill roll is modified, and consequently, the point of contact.

Higher is the distance between the lip and the point of contact, higher is the elastic performance of the material.

The distance between the lip of the head and the first roll is comprised between 2 and 5 mm, preferably 3–5 mm; the distance between the lip and the contact point is in general from 10 to 15 mm.

It is convenient to operate in such a way as not to have sliding of the film between the first and the second roll. This effect is obtainable, for example, subjecting the film to a counterpression action.

The film coming out the cooling rolls is collected on bobbins of suitable breath and lenght.

By means of a constant tension applied to the film realized by a series of motorized rolls each of which endowed of positive relative rotation, the movement of the film on the winding reel is rendered uniform.

A high difference of speed between the winding reel and the first chill roll implies a great longitudinal stress and consequently the production of very stiff film. Low velocity difference conversely implies a low stress and therefore a more elastic film.

Due to the quenching to which the material is subjected at the exit of the spreading head and of the composition of the material forming the main layer, the polyethylene matrix of the film presents a fine spherulitic morphology.

The following examples are given to illustrate and not to limit the invention.

EXAMPLE 1

A battery of monoscrew extruders A–C with a screw variable span is fed in the order with LLDPE Dow 2100 (density 0.918 g/cm$^3$) (extruder A), with polyethylene Dow 4104 (density 0.904 g/cm$^3$) (extruder B), with LLDPE polyethylene Dow 22376 (density 0.928 g/cm$^3$) (extruder C).

The mass capacity at the exit of the various extruders is respectively 70%, 7% and 15%.

LDPE LD150 from Dow is introduced into extruder A with a hopper capacity of 8%.

The turns of the screws of extruders A–C are 57, 63 and 85 rpm respectively and the temperature of the melt coming out from the extruders are 265°, 180° and 265° C. respectively.

The material coming out from the extruders is sent to a device (feed block) which prepares the material stratified as a function of the extruders from which it comes out.

The spreading head has a slit of 0.5 mm and the distance between the head and the contact point with the first chill roll is regulated at 15 mm. The temperature of the material at the exit of the slit is 235° C.

The water temperature of the first roll is maintained at 20° C.; the velocity of the roll is 340 m/min.

The temperature of the material coming out from the first roll is below 90° C. The material goes then to a second roll cooled with water mantained at 15° C.

The speed of the second roll is 400 m/min.

The material coming out from the chill roll is collected under constant tension on winding reels of given breaths and lenghts.

The film has the thickness of 25 micron and presents the following mechanical characteristics.

|  |  | Machine direction | Trasversal direction |
|---|---|---|---|
| Young's modulus (ASTM D 882-88) | N/mm$^2$ | 56 | 209 |
| Yield tensile stress (ASTM D 882) | N/mm$^2$ | 25.8 | 9.92 |
| Tensile stress at break (ASTM D 882-88) | N/mm$^2$ | 65.1 | 38.9 |
| Elongation at break (ASTM D 882-88) | % | 376 | 969 |

-continued

|  |  | Machine direction | Trasversal direction |
|---|---|---|---|
| Tear resistance (ASTM D 1922-67) | mN | 75 | 75 |
| Impact resistance (ASTM D 1709-75) | g | 100 | 100 |
| Friction coefficient (ASTM D 1784-78) | g | 247 | 355 |

EXAMPLE 2

Example 1 is repeated with the difference that the extruder B is fed with polyethylene Engage of Dow.

The characteristics of the film are similar to those reported for the film of example 1.

EXAMPLE 3

Example 1 is repeated with the difference that the temperature of cooling water of the first chill roll is maintained at 18° C. and the one of the second chill roll at 12° C. The velocity of the second chill roll was 430 m/min.

The yield tensile stress of the film was 60 N/mm² and the elongation at break of 90%. The film thickness was 12 micron.

COMPARATIVE EXAMPLE 1

Example 1 is repeated with the difference that the extruder A in not fed with LDPE LD 150 of Dow.

The temperature of cooling water of the first roll was mantained between 30 and 35° C.; that one of the second roll between 28°–30° C. and the speed difference between the first and the second roll was 5%.

The mechanical characteristic of the film were the following.

|  |  | Machine direction | Trasversal direction |
|---|---|---|---|
| Young's modulus (ASTM D 882-88) | N/mm² | 110 | 167 |
| Yield tensile stress (ASTM D 882) | N/mm² | 7.1 | 7.9 |
| Tensile stress at break (ASTM D 882-88) | N/mm² | 35 | 22 |
| Elongation at break (ASTM D 882-88) | % | 533 | 843 |
| Tear resistance (ASTM D 1922-67) | mN | 229 | 416 |
| Impact resistance (ASTM D 1709-75) | g | 180 | 180 |

Maintaining the temperature of the cooling water of the first and second roll to the values reported in example 1 and using the speed difference between the rolls therein indicated, a rigid but not stretchable film is obtained.

COMPARATIVE EXAMPLE 2

Example 1 is repeated with the difference that there are used the cooling conditions of the rolls and the speed difference between the same reported in comparative example 1.

A film is obtained with mechanical properties similar to those reported in comparative example 1.

What is claimed is:

1. Multilayer film particularly suitable for packaging of pallet units, comprising a main layer containing as an essential component linear low density polyethylene LLDPE with a density comprised between 0.915 and 0.935 g/cm³, said LLDPE being in admixture with 8 to 40% by weight, based on the weight of said LLDPE, of low density polyethylene LDPE, said multilayer film having a yield tensile stress comprised in the range from 15 to 70 N/mm² and an elongation at break from 60 to 500% in the machine direction and being obtained by a cast-extrusion process wherein the stratified sheet exiting the spreading head is collected on a first chill roll cooled with water maintained at a temperature between 10° C. and 25° C. and thereafter on a second chill roll cooled with water maintained at a temperature equal to or lower than that of the first chill roll and comprised between 10° C. and 20° C., the peripheral speed of said chill roll being from 10 to 40% higher than that of the first chill roll.

2. Film according to claim 1 comprising a layer of adhesive material compatible with LLDPE.

3. Film according to claim 2 wherein the layer of adhesive material is formed of LLDPE with a density comprised between 0.895 and 0.910 g/cm³.

4. Film according to claim 2 wherein the layer of adhesive material amounts from 5 to 15% by weight with respect to LLDPE of the main layer.

5. Film according to claim 1 further comprising a layer formed of LLDPE having a density higher than that of the LLDPE of the main layer.

6. Film according to claim 1 wherein the main layer forms the central layer of a three layer film.

7. Multilayer film according to claim 6 having thickness from 10 to 100 micron.

8. Multilayer film according to claim 1 having yield tensile stress comprised from 40 to 70 N/mm² and elongation at break from 60 to 200%.

* * * * *